(12) United States Patent
Nishikawa et al.

(10) Patent No.: US 11,105,213 B2
(45) Date of Patent: Aug. 31, 2021

(54) SEAL FIN, SEAL STRUCTURE, TURBO MACHINE, AND METHOD FOR MANUFACTURING SEAL FIN

(71) Applicant: MITSUBISHI HITACHI POWER SYSTEMS, LTD., Yokohama (JP)

(72) Inventors: Toyoharu Nishikawa, Tokyo (JP); Yoshihiro Kuwamura, Tokyo (JP); Hiroharu Oyama, Yokohama (JP); Katsuhisa Hamada, Yokohama (JP); Hideaki Sugishita, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 154 days.

(21) Appl. No.: 15/778,730

(22) PCT Filed: Nov. 29, 2016

(86) PCT No.: PCT/JP2016/085350
§ 371 (c)(1),
(2) Date: May 24, 2018

(87) PCT Pub. No.: WO2017/098959
PCT Pub. Date: Jun. 15, 2017

(65) Prior Publication Data
US 2018/0355743 A1    Dec. 13, 2018

(30) Foreign Application Priority Data

Dec. 9, 2015 (JP) .............................. JP2015-240487

(51) Int. Cl.
*F01D 11/02*    (2006.01)
*F01D 5/20*     (2006.01)
(Continued)

(52) U.S. Cl.
CPC ................ *F01D 11/02* (2013.01); *F01D 5/20* (2013.01); *F01D 5/225* (2013.01); *F01D 11/08* (2013.01);
(Continued)

(58) Field of Classification Search
CPC .......... F01D 11/10; F01D 11/02; F01D 11/08; F01D 5/225; F04D 29/083; F04D 29/102;
(Continued)

(56) References Cited

U.S. PATENT DOCUMENTS 1,505,647 A * 8/1924 Junggren ................ F01D 11/02
                                                     277/418
1,651,855 A * 12/1927 Warren ................... F01D 11/02
                                                     277/413
(Continued)

FOREIGN PATENT DOCUMENTS

CN    102322529 A    1/2012
CN    102865108 A    1/2013
(Continued)

OTHER PUBLICATIONS

Office Action dated Jun. 25, 2019, issued in counterpart KR Application No. 10-2018-7015327, with English translation (7 pages).
(Continued)

*Primary Examiner* — Eugene G Byrd
(74) *Attorney, Agent, or Firm* — Westerman, Hattori, Daniels & Adrian, LLP

(57) ABSTRACT

There are provided a seal fin, a seal structure, a turbo machine, and a method for manufacturing a seal fin. The seal fin suppresses leak of a fluid from a gap between a first and a second structures facing each other in a radius direction, and is formed on the first structure while keeping a clearance with respect to the second structure. The seal fin includes: a (Continued)

fin main body extending in the radius direction; and a protrusion being formed between a front face of the fin main body and a tip face and protruding toward an upstream side. A length of the protrusion is 1.5 times a length of the fin main body or less; an angle of the protrusion is 75 degrees or less; and a tilt angle of the fin main body is set in a range of −60 degrees or more and 60 degrees or less.

12 Claims, 6 Drawing Sheets

(51) Int. Cl.
    *F01D 11/08*     (2006.01)
    *F16J 15/447*     (2006.01)
    *F02C 7/28*     (2006.01)
    *F01D 5/22*     (2006.01)

(52) U.S. Cl.
    CPC .............. *F02C 7/28* (2013.01); *F16J 15/447* (2013.01); *F05D 2220/31* (2013.01); *F05D 2220/32* (2013.01); *F05D 2240/55* (2013.01); *F05D 2250/70* (2013.01)

(58) Field of Classification Search
    CPC ... F04D 29/164; F04D 29/321; F16J 15/4472; F16J 15/447; F05D 2220/30; F05D 2250/71; F02C 7/28
    See application file for complete search history.

(56) References Cited

U.S. PATENT DOCUMENTS

| | | | | |
|---|---|---|---|---|
| 1,689,735 A * | 10/1928 | Losel | ................... | F16J 15/4472 277/419 |
| 1,708,044 A * | 4/1929 | Baumann | .............. | F01D 11/001 277/418 |
| 1,756,958 A * | 5/1930 | Schmidt | ................... | F01D 11/02 415/131 |
| 1,831,224 A * | 11/1931 | Baumann | .............. | F16J 15/4476 277/418 |
| 3,940,153 A * | 2/1976 | Stocker | ................ | F16J 15/4472 277/418 |
| 4,103,899 A * | 8/1978 | Turner | ................... | F01D 11/001 277/303 |
| 4,161,318 A * | 7/1979 | Stuart | ..................... | B23P 6/002 277/431 |
| 4,664,593 A * | 5/1987 | Hayashi | ................ | F04D 29/384 415/119 |
| 5,211,535 A * | 5/1993 | Martin | ................... | F01D 11/02 277/413 |
| 5,218,816 A * | 6/1993 | Plemmons | .............. | F01D 11/02 277/419 |
| 5,639,095 A * | 6/1997 | Rhode | .................. | F16J 15/4472 277/303 |
| 6,164,655 A * | 12/2000 | Bothien | ................. | F16J 15/447 277/303 |
| 6,932,350 B1 * | 8/2005 | Husted | ................... | F16J 15/406 277/421 |
| 6,994,523 B2 * | 2/2006 | Eguchi | .................. | F04D 29/384 416/228 |
| 8,167,547 B2 * | 5/2012 | Wu | ........................ | F01D 11/001 277/418 |
| 10,087,768 B2 * | 10/2018 | Burdgick | .............. | F01D 11/005 |
| 2001/0031201 A1 * | 10/2001 | Lawer | ....................... | B23H 9/10 415/173.4 |
| 2002/0114698 A1 * | 8/2002 | Mimura | ................. | F04D 29/164 415/220 |
| 2005/0201859 A1 * | 9/2005 | Coulon | ................... | F01D 11/02 415/170.1 |
| 2008/0124215 A1 * | 5/2008 | Paolillo | ................. | F01D 11/001 415/173.7 |
| 2008/0263863 A1 * | 10/2008 | Rose | .................... | B23K 26/342 29/889.1 |
| 2009/0033037 A1 * | 2/2009 | Varanasi | ................. | F01D 11/10 277/355 |
| 2010/0074733 A1 * | 3/2010 | Little | ...................... | F01D 11/02 415/173.5 |
| 2010/0098533 A1 * | 4/2010 | Grussmann | ............. | F01D 25/24 415/203 |
| 2010/0189542 A1 * | 7/2010 | Maltson | ................... | F01D 25/12 415/1 |
| 2010/0276892 A1 | 11/2010 | Sanchez et al. | | |
| 2011/0085892 A1 * | 4/2011 | John | ...................... | F01D 11/02 415/171.1 |
| 2011/0280715 A1 * | 11/2011 | Garg | ...................... | F01D 11/02 415/174.5 |
| 2012/0034072 A1 * | 2/2012 | Bagnall | ................. | F01D 11/001 415/170.1 |
| 2013/0115096 A1 * | 5/2013 | Itzel | ....................... | F01D 5/288 416/241 B |
| 2013/0149118 A1 * | 6/2013 | Lotfi | ....................... | F01D 11/02 415/174.5 |
| 2013/0280047 A1 | 10/2013 | Willett, Jr. et al. | | |
| 2017/0022838 A1 * | 1/2017 | Kuwamura | .......... | F16J 15/4472 |

FOREIGN PATENT DOCUMENTS

| | | | | |
|---|---|---|---|---|
| JP | 62-133902 U | 8/1987 | | |
| JP | H02-173302 A | 7/1990 | | |
| JP | 2001-200937 A | 7/2001 | | |
| JP | 2008-196522 A | 8/2008 | | |
| JP | 2011237033 A * | 11/2011 | ............. | F01D 11/02 |
| JP | 2013-19537 A | 1/2013 | | |
| JP | 2015-108301 A | 6/2015 | | |

OTHER PUBLICATIONS

Office Action dated Jul. 1, 2019, issued in counterpart CN Application No. 201680070948.1, with English translation (12 pages).
Office Action dated Jun. 6, 2017, issued in counterpart Japanese Application No. 2015-240487, with English translation (6 pages).
Office Action dated Jul. 22, 2020, issued in counterpart to IN Application No. 201817020348, with English Translation. (7 pages).

* cited by examiner

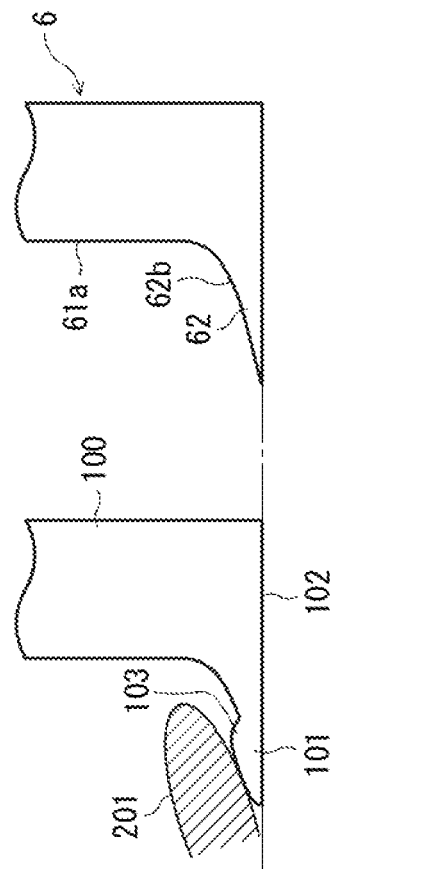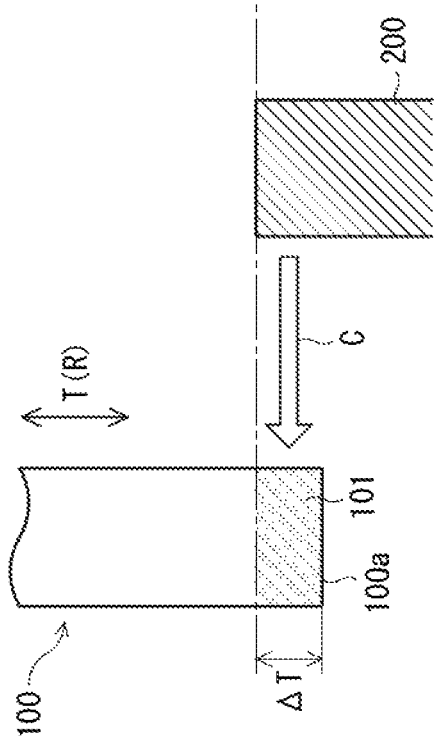

SEAL FIN, SEAL STRUCTURE, TURBO MACHINE, AND METHOD FOR MANUFACTURING SEAL FIN

TECHNICAL FIELD

The present invention relates to a seal fin that suppresses leak of a fluid from a gap between two structures rotating relative to each other, a seal structure and a turbo machine using the seal fin, and a method for manufacturing a seal fin.

BACKGROUND

In a turbo machine such as a steam turbine, a gas turbine, or a turbo compressor, possible leak of an operation fluid such as steam from a gap between a stationary side and a rotating side causes a loss (leak loss) of the efficiency in the turbo machine. With the foregoing problem in view, a turbo machine uses a non-contact seal structure such as a labyrinth seal to avoid leak of an operation fluid.

Patent Literatures 1 and 2 disclose techniques related to a non-contact seal structure for a turbo machine. Hereinafter, description will now be made in relation to techniques disclosed in Patent Literatures 1 and 2. In the description, the reference signs used in Patent Literatures 1 and 2 are indicated in brackets.

Patent literature 1 discloses "a seal device that seals the space between a stationary body (11) and a rotating body (12) and that includes: a fin (13) protruding from the stationary body (11) toward the surface (12a) of the rotating body (12) and having a sharp tip; and a coarse face section (17) formed on the surface (12a) of the rotating body (12)" (see the front page, paragraph [0021], and FIGS. 1 and 2). According to Patent Literature 1, the coarse face section (17) disturbs flow surrounding the fin (13), so that the pressure loss of the fluid (14) is increased and an amount of the fluid (14) that leaks from the space between the fin (13) and the rotating body (12) can be reduced.

Patent Literature 2 discloses "a labyrinth seal that seals the gap between the stationary casing (12) and the blade shroud (11) that are the immovable element and the movable element in a turbo machine, respectively, wherein a terminal element (34) that constitute the tip of a seal fin (26) disposed from the stationary casing (12) toward the inside of the radius direction is inclined toward the upstream side in the flow direction of the leak flow (21)" (see, for example, the front page, paragraphs [0039] and [0045], FIGS. 1 and 2). According to Patent Literature 2, the shape of the seal fin (26) generates a circulation vortex flow (36) of the leak fluid (21) on the upstream side of the seal fin (26) and the circulation vortex flow (36) reduces the effective region of the gap between the stationary casing (12) and the blade shroud (11), resulting in reducing the leak flow (21) passing through the gap.

PRIOR ART REFERENCE

Patent Literature

[Patent Literature 1] Japanese Laid-Open patent Publication No. 2008-196522
[Patent Literature 2] Japanese Laid-Open patent Publication No. 2013-019537

SUMMARY

Problems to be Solved by Invention

Unfortunately, the seal device disclosed in Patent Literature 1 does not have satisfactory leak-suppressing effect or leak loss suppressing effect of a turbo machine. This is because the fin (13) takes a straight shape that straightly extends toward the rotating body (12), which means that the shape would not effectively restrict flow (leak) of the fluid (14) with the rotating body (12).

Restriction in processing compels the tip of the fin (13) to be rounded (here, the term "round" means a round shape having a radius of curvature that affects a flow of fluid at least). If the fin (13) has a rounded tip, the point (hereinafter referred to as "separation point") where the fluid (14) is separated by the tip of the fin (13) shifts in the direction that substantially widens the clearance between the tip and the surface (12a) of the rotating body (12), and also the proceeding direction of the fluid (14) at the separation point turns to the downstream side (the side that the fluid (14) passes the fin (13)), so that the contraction flow is weakened. This degrades the leak-suppressing effect of the seal device and the leak loss suppressing effect of the turbo machine as compared with the structure having an ideal tip shape not being rounded.

The labyrinth seal of Patent Literature 2 also compels the tip of the seal fin (26) to be rounded and raises the same problem. In particular, if a seal fin has an inclined tip being rounded as in the case of the seal fin (26) disclosed in Patent Literature 2, the angle of the rounded portion of the tip easily becomes 90 degrees or more (which means a range of the rounded portion is likely to be widened). This degrades the leak-suppressing effect due to the rounded tip further than the case using the straight-shaped seal fin disclosed in Patent Literature 1.

Furthermore, the labyrinth seal disclosed in Patent Literature 2 requires the processing to form the terminal element (34) of the seal fin (26) into a rounded shape. Requiring a predetermined processing precision, the seal fin (26) is preferably processed through a cutting process in shaping. However, a cutting process generates flush and thus, requires an operation to remove the flush, which raises the production cost of the seal fin (26).

With the foregoing problems in view, the object of the present invention is to provide a seal fin, a seal structure, a turbo machine, and a method for manufacturing a seal fin that can obtain a high leak-suppressing effect while suppressing a rise of a production cost and can reduce the leak loss of the turbo machine.

Means to Solve the Problem (1) To attain the above object, the present invention provides a seal fin that suppresses leak of a fluid from a gap between a first structure and a second structure facing each other in a radius direction with the gap inbetween and rotating around an axis line relative to each other and that extends from the first structure toward the second structure while keeping a clearance between a tip face thereof on an extending direction and the second structure, the seal fin including: a fin main body extending in the radius direction; and a protrusion formed between a front face facing an upstream side in a flow direction of the fluid at the fin main body and the tip face facing the second structure, the protrusion protruding toward the upstream side, wherein a length of the protrusion along the axis line 1.5 times a length of the fin main body along the axis line or less; an angle of the protrusion is 75 degrees or less; and a tilt angle of the protrusion with respect to the tip face of the fin main body is set in a range of −60 degrees or more and 60 degrees or less.

(2) The protrusion is preferably a sharp protrusion having a sharp tip.

(3) The fin main body preferably include an inclined face formed between the tip face and a back face facing a downstream side in the flow direction of the fluid, the inclined face facing toward the axis line.

(4) A length of the protrusion along the axis line is preferably at least 0.1 times and at most 0.5 times a length of the fin main body along the axis line.

(5) The protrusion preferably have an edge face facing the second structure and being flush with the tip face of the fin main body.

(6) To attain the above object, the present invention provides a seal structure that suppresses leak of a fluid from a gap between a first structure and a second structure facing each other in a radius direction with the gap inbetween and rotating around an axis line relative to each other, the seal structure including: a seal fin being defined in one of above (1)-(5) and being formed on the first structure so as to extend toward the second structure while keeping a clearance between a tip face thereof on an extending direction and the second structure.

(7) To attain the above object, the present invention provides a turbo machine including the seal structure defined in above (6).

(8) To attain the above object, the present invention provides a method for manufacturing a seal fin in a seal structure that suppresses leak of a fluid from a gap between a first structure and a second structure facing each other in a radius direction with the gap inbetween and rotating around an axis line relative to each other, the seal fin extending from the first structure toward the second structure while keeping a clearance between a tip face thereof on an extending direction and the second structure, the method including: a cutting step of setting, in a fin raw material, a predetermined range from a surface of a tip face in a thickness direction to be a prospective cut portion and forming a protrusion protruding toward a cutting direction that crosses the thickness direction by cutting the prospective cut portion in the cutting direction, the protrusion being formed on a face crossing the cutting direction.

(9) The method preferably further includes a grinding step of grinding the protrusion into a sharp protrusion having a sharp tip.

Effect of Invention

According to the present invention, the fluid flowing toward the clearance between the seal fin and the second structure is guided by the protrusion provided toward the upstream side of the seal fin, and consequently the proceeding direction of the fluid at the separation point (where the fluid separates from the seal fin) turns to the upstream side (the direction opposite to a direction in which the fluid passes the seal fin), so that the contraction flow of the fluid becomes stronger.

Accordingly, a high leak-suppressing effect can be obtained, and consequently, a leak loss of the turbo machine can be reduced.

In addition to the above, since the principal dimensions of the protrusion, which are the length of the protrusion along the axis line, the angle and the tilt angle of the protrusion, are set in proper ranges, a higher leak-suppressing effect can be obtained.

Since the protrusion can be formed using the generation of a flush accompanied by the cutting process, the requirement for removing the flush can be eliminated and also the protrusion can be formed with ease at low cost, suppressing an increase in production cost that may be caused by forming the protrusion.

BRIEF DESCRIPTION OF DRAWING

FIG. 4A is a diagram relating to a seal fin according to an embodiment of the present invention; FIG. 4B is a diagram relating to a traditional seal fin; and FIG. 4C is a diagram relating to a traditional ideal seal fin (FIGS. 4A-4C each omit slant lines representing the section of the seal fin).

FIGS. 6A, 6B, and 6C are schematic sectional views describing a method of manufacturing the step seal according to the first embodiment; FIG. 6A is a diagram illustrating a cutting step; FIG. 6B is a diagram illustrating a grinding step; and FIG. 6C is a diagram illustrating a state where the product is completely manufactured after the grinding step (omitting slant lines representing the section of the step seal in FIGS. 6A, 6B, and 6C).

EMBODIMENTS TO CARRY OUT INVENTION

Hereinafter, description will now be made in relation to an embodiment of the present invention with reference to the accompanying drawings.

In the present invention, the description is made in relation to an example that applies the seal fin, the seal structure, and the turbo machine of the present invention to a steam turbine.

The following embodiments are exemplary and do not intend to exclude various modification and application of technique not explicitly described in the following embodiments. The structures of the embodiments can be modified without departing from the scope of the embodiments, can be selected and omitted if required, and can be appropriately combined.

In the following description, the terms "upstream" and "downstream" respectively mean the upstream and the downstream with respect to the flow of steam S in the steam turbine unless otherwise specified. In other words, the left side in FIGS. 1-4 is regarded as the upstream side and the right side in the same drawings is regarded as the downstream side.

In the description, the direction toward the axis line CL of the steam turbine is regarded as the inner circumference side or inside, and the opposite side, the direction departing from the axis line CL is regarded as the outer circumference side or outside.

1. Overall Configuration of Steam Turbine

Figure 1:
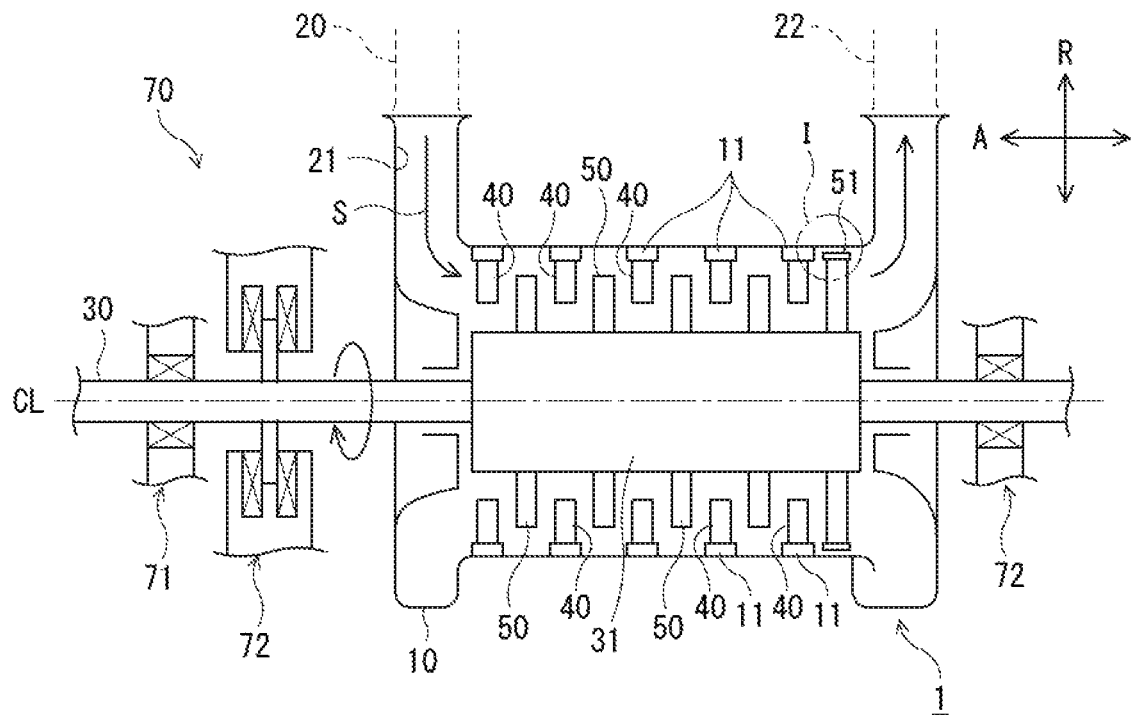
FIG. 1 is a schematic longitudinal sectional view illustrating the entire structure of a steam turbine according to an embodiment of the present invention.

As illustrated in FIG. 1, the steam turbine 1 (turbo machine) of the present embodiment is formed of a casing (first structure) 10, a rotating shaft 30 that is rotatably provided inside the casing 10 and that transmits power to a non-illustrated machine such as a generator, stationary vanes 40 provided to the casing 10, rotating vanes 50 provided to the rotating shaft 30, and a bearing 70 that supports the rotating shaft 30 so as to allow the rotating shaft 30 to rotate around the axis line CL. The stationary vanes 40 and the rotating vanes 50 are blades extending in the radius direction R of the rotating shaft 30.

The casing 10 is immobile while the rotating vanes 50 rotate around the axis line CL. This means that the casing 10 and the rotating vanes 50 (including a shroud 51 to be detailed below) rotate relative to each other.

The steam (fluid) S is introduced from a main inlet 21 formed on the casing 10 via a steam supplying pipe 20 connected to a non-illustrated steam providing source and is exhausted from a steam exhausting pipe 22 connected to the downstream side of the steam turbine.

The inner space of the casing 10 is airtightly sealed and serves as the flow path of the steam S. On the inner wall of the casing 10, partition-plate outer rings 11 each in a form of a ring through which the rotating shaft 30 is placed are rigidly fixed.

The bearing 70 includes a journal bearing device 71 and thrust bearing devices 72 and rotatably supports the rotating shaft 30.

A large number of stationary vanes 40 each extend toward the inner circumference from the casing 10, are radially arranged around the rotating shaft 30 to constitute a circular stationary vane group, and are each retained by the partition-plate outer ring 11 described above.

Multiple circular stationary vane groups each including multiple stationary vanes 40 are arranged along the axis direction A of the rotating shaft 30 (hereinafter, simply referred to as the axis direction) at intervals. Each circular stationary vane group converts the pressure energy of the steam S into the velocity energy and lets the steam S having increased velocity energy flow into the rotating vanes 50 adjacent to the circular stationary vane group on the downstream side.

The rotating vanes 50 are rigidly installed on the outer circumference of the shaft main body 31 of the rotating shaft 30. A large number of rotating vanes 50 are radially arranged downstream of each circular stationary vane group to constitute a circular rotating vane group.

A pair of a circular stationary vane group and a circular rotating vane group is regarded as a single stage. In the rotating vane group of the last stage, the tips of the rotating vanes 50 neighboring in the circumference direction of the rotating shaft 30 (hereinafter, simply referred to as the circumference direction) are coupled to each other by a ring-form shroud (second structure) 51. Alternatively, the shroud 51 may be applied to another rotating group(s) and/or a stationary vane group(s) in addition to the rotatable vane group of the last stage.

2. Seal Structure 2-1. Overall Configuration of the Seal Structure

Figure 2:
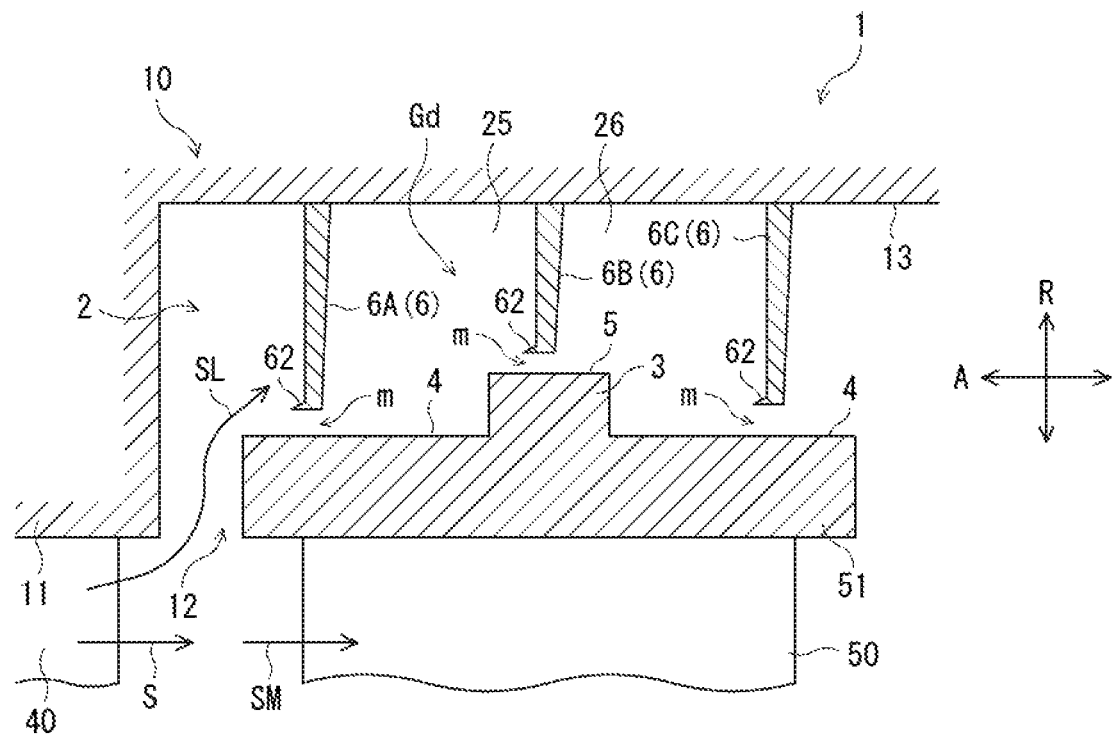
FIG. 2 is a sectional view of a main part of the steam turbine according to an embodiment of the present invention, specifically an enlarged sectional view of the part I of FIG. 1.

As illustrated in FIG. 2, at the downstream side of the partition-plate outer ring 11 in the axis direction, a groove (hereinafter, an annular groove) 12 in the form of a circular ring is formed, which has a radius widened from the partition-plate outer ring 11 and the base face 13 (hereinafter also referred to as a casing base face) in the inner circumference face of the casing 10. The annular groove 12 accommodates the shroud 51 and the casing base face 13 is opposed to the shroud 51 via a gap Gd in the radius direction R.

Steam MS composing the most part of the steam S flows into the rotating vanes 50 and the energy of the steam MS is converted into rotational energy, which consequently rotates the rotating shaft 30. In contrast, steam (hereinafter leak steam) SL composing part (e.g., several percent) of the steam S does not flow into the rotating vanes 50 and leaks into the annular groove 12. Since the energy that the leak steam SL possess is not converted into the rotational energy, the leak steam SL may cause leak loss that degrades the efficiency of the steam turbine 1.

Considering the above, a seal structure (step-type labyrinth seal) 2 according to an embodiment is provided at the gap Gd between the casing 10 and the rotating vanes 50. Hereinafter, description will now be made in relation to the seal structure 2.

The shroud 51 includes a step portion 3 having a center portion in the axis direction A protruding to be formed into a step shape. Specifically, a face of the shroud 51 on the outer circumference side in the radius direction R includes bottom faces 4 and a step portion 3 formed to have a step face 5 that protrudes toward the outer circumference side in the radius direction R further than the bottom faces 4.

On the casing base face 13, three seal fins 6A, 6B, and 6C are provided so as to extend toward the inner circumference side in the radius direction R (not appear in FIG. 1). Hereinafter, the seal fins 6A, 6B, and 6C are represented by the seal fin 6 if not discriminated from one another. The seal fin 6 takes an annular shape having a center corresponding to the axis line CL (see FIG. 1) and has a transversal sectional shape (the shape of a section perpendicular to the circumference direction) illustrated in FIG. 2 uniformly along the entire circumference.

The seal fin 6A disposed on the upstream side protrudes toward the bottom face 4 on the upstream side with respect to the step portion 3; the seal fin 6B disposed in the middle protrudes toward the step face 5 of the step portion 3; and the seal fin 6C disposed on the downstream side protrudes toward the bottom face 4 on the downstream side with respect to the step portion 3. The middle seal fin 6B is formed to have a length in the radius direction R shorter than those of the seal fin 6A on the upstream side and the seal fin 6C on the downstream side.

Each seal fin 6 forms a minute clearance (hereinafter also referred to as a clearance) m between the seal fin 6 and the shroud 51 in the radius direction R. The dimensions of the minute clearances m are set within the range in which the seal fin 6 is not in contact with rotating vanes 50, considering the thermal expansion amounts of the casing 10 and the rotating vane 50, and the centrifugal elongation amount of the rotating vane 50.

In the gap Gd, an upstream cavity 25 and a downstream cavity 26 are defined by the annular groove 12, the shroud 51, and the seal fin 6. The positions of the seal fin 6 in the axis line direction are appropriately set according to the behavior of the flow of the leak steam SL that leaked into the cavities 25 and 26.

2-2. Seal Fin

The seal fin 6 is largely characterized by the structure of the tip directing the bottom faces 4 and the step face 5 of the shroud 51. Description will now be made in relation to the structure of the tip with reference to FIGS. 3, 4A-4C.

Figure 3:
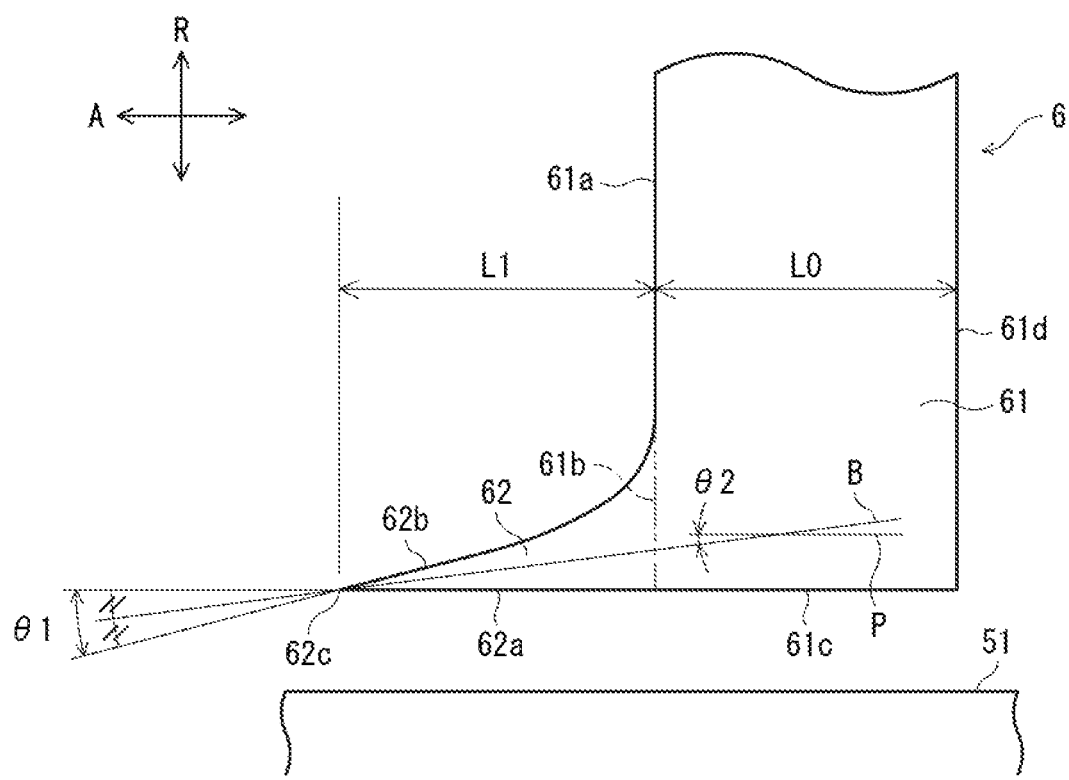
FIG. 3 is a schematic sectional view illustrating the configuration of a tip of a seal fin according to an embodiment of the present invention (omitting slant lines representing the section of the seal fin).
Figure 4:
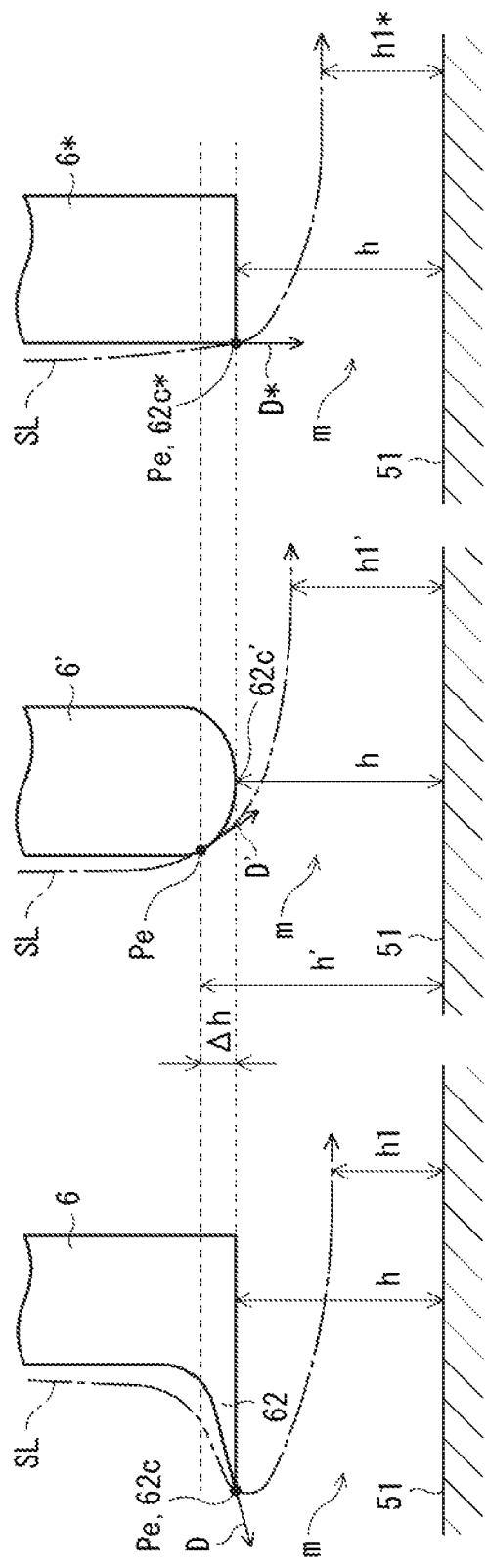
FIGS. 4A-4C are schematic sectional view for describing an effect of a seal fin according to an embodiment of the present invention.

As illustrated in FIG. 3, a seal fin 6 includes a fin main body 61 that extends inward from the casing base face 13 in the radius direction R (see FIG. 2) and a protrusion 62 integrally formed at an inner circumference edge portion of the fin main body 61. The protrusion 62 is a protrusion being formed on the inner circumference edge portion (tip portion) 61b of the front face (the face facing the upstream side) of the fin main body 61 and protruding toward the upstream side. Here, the inner circumference edge portion 61b is an imaginary predetermined region being part of the front face 61a and being adjacent to the inner circumference edge face (a tip face, a face opposing to the shroud 51) 61c of the fin main body 61. This means that the protrusion 62 protruding toward the upstream side is formed between the front face 61a and the inner circumference edge face 61c of the fin main body 61.

A protrusion tip 62c of the protrusion 62 (the tip 62c being an intersection of the inner circumference edge face 62a and its back face (i.e., the face on the opposite side of the inner circumference edge face 62a) would have a round shape (here, the term "round" means a round shape having a radius of curvature that affects a flow of fluid at least) as it is (without being processed), so that the protrusion tip 62c undergoes a sharpening process. For the above, the protrusion 62 is hereinafter also referred to as the sharp protrusion 62. In other words, the sharp protrusion 62 corresponds to a protrusion having a protrusion tip 62c sharpened by the sharpening process as compared with a tip not being processed.

The inner circumference edge face 62a of the protrusion tip 62c is an edge face opposing to the shroud 51.

In this example, the sharp protrusion 62 is formed to have the inner circumference edge face 62a flush with the inner circumference edge face 61c of the fin main body 61. In other words, the sharp protrusion 62 sharply protrudes further than the front face 61a by extending the inner circumference edge face 61c toward the upstream side. Additionally, the inner circumference edge face 61c and the inner circumference edge face 62a of the present embodiment are formed to be parallel (including substantially parallel) with the axis line CL and also perpendicular (including substantially perpendicular) to the back face 61d of the fin main body 61.

Hereinafter, the effects of the seal fin 6 of an embodiment of the present invention will now be described with reference to FIGS. 4A-4C.

FIGS. 4A, 4B and 4C are schematic sectional views each describing an effect of a seal fin according to an embodiment of the present invention; FIG. 4A is a diagram relating to a seal fin according to an embodiment of the present invention; FIG. 4B is a diagram relating to a traditional seal fin; and FIG. 4C is a diagram relating to a traditional ideal seal fin (omitting slant lines representing the section of the seal fin in each of FIGS. 4A-4C).

In FIGS. 4A, 4B and 4C, the heights of the clearance m between the seal fin 6 and the shroud 51 according to an embodiment of the present invention, the clearance m of a traditional seal fin 6' and the shroud 51, and the clearance m of a traditional ideal seal fin 6* and the shroud 51 are represented by the same dimension (hereinafter, also referred to as "graphical clearance") h.

The traditional ideal seal fin 6*, which has no sharp protrusion 62 and has a tip 62c* not being rounded, lets the leak steam SL flow as illustrated by an arrow of the one-dotted line in FIG. 4C. Specifically, since the tip 62c* takes an ideal shape not being rounded, the flow of the leak steam SL separates from the seal fin 6* at the tip 62c* (the tip 62c* comes to the separation point Pe) and the flow direction D* of the leak steam SL at the separation point directly aims at the shroud 51. Accordingly, a strong contraction flow can be obtained.

For the above, the leak steam SL after the contraction provides a substantial clearance h1* remarkably narrower than the graphical clearance h and a small contraction coefficient (h1*/h) can be obtained (i.e., a high contraction flow effect can be obtained).

In contrast to the above, the traditional seal fin 6' not having the sharp protrusion 62 lets the leak steam SL flow as illustrated by an arrow of the one-dotted line in FIG. 4B. Specifically, since the tip 62' is rounded, the leak steam SL flows along the part of the round and then separates from the seal fin 6' at the root side (upper side in FIG. 4B) of the tip 62' (the separation point moves from the tip 62c' toward the root side by $\Delta h$), so that the substantial clearance before the contraction comes to be a clearance h' wider than the graphical clearance h (h'=h+$\Delta h$). In addition, since the direction D' of the flow of the leak steam SL at the separation point Pe aims at the downstream side (the side that the flow passes the seal fin 6'), the contraction flow is weak.

For the above, the substantial clearance h1' of the leak steam SL after the contraction becomes wider than the substantial clearance h1* of the traditional ideal seal fin 6*, and the contraction coefficient (h1'/h) becomes larger than the contraction coefficient (h1*/h) of the traditional ideal seal fin 6* (which means that low contraction effect is obtained). Accordingly, the amount FL (hereinafter, referred to as a leak flow amount) of steam that flows to the downstream of the seal fin 6' becomes larger.

In the meantime, the seal fin 6 according to an embodiment of the present invention lets the leak steam SL flow as illustrated by an arrow of the one-dotted line in FIG. 4A. The presence of the protrusion 62 protruding upstream at the tip of the seal fin 6 allows the direction D the flow of the leak steam SL to direct to the upstream side (i.e., the side opposite to the side that the flow passes the seal fin 6) at the separation point Pe, and consequently it is possible to obtain a contraction flow stronger than that obtained by the traditional ideal seal fin 6*. Thus, the substantial clearance h1 of the leak steam SL after the contraction becomes narrower than the substantial clearance h1* of the traditional ideal seal fin 6*.

This is because the presence of the sharp protrusion 62 protruding toward the upstream increases the flow resistance against the leak steam SL, and is also because the leak steam SL is once guided to the upstream side and, when making a U-turn to pass through the clearance m between the seal fin 6 and the shroud 51, the leak steam SL flows in the vicinity of the shroud 51 due to the U-turn (which means the substantial clearance h1 narrows).

In addition to the above, since the protrusion 62 is sharpened, the leak steam SL comes to separate at the tip 62c of the protrusion, so that the substantial clearance of the leak steam SL before the contraction equates (or substantially equates) to the graphical clearance h.

Accordingly, the contraction coefficient (h1/h) of the seal fin 6 becomes smaller than that (h1*/h) of the traditional ideal seal fin 6* (which means that the higher contraction flow effect can be obtained). Therefore, the leak flow amount FL decreases.

Here, preferable ranges of the principal dimensions L1, θ1, and θ2 of the sharp protrusion 62 will now be described with reference to FIGS. 3 and 5.

Figure 5:
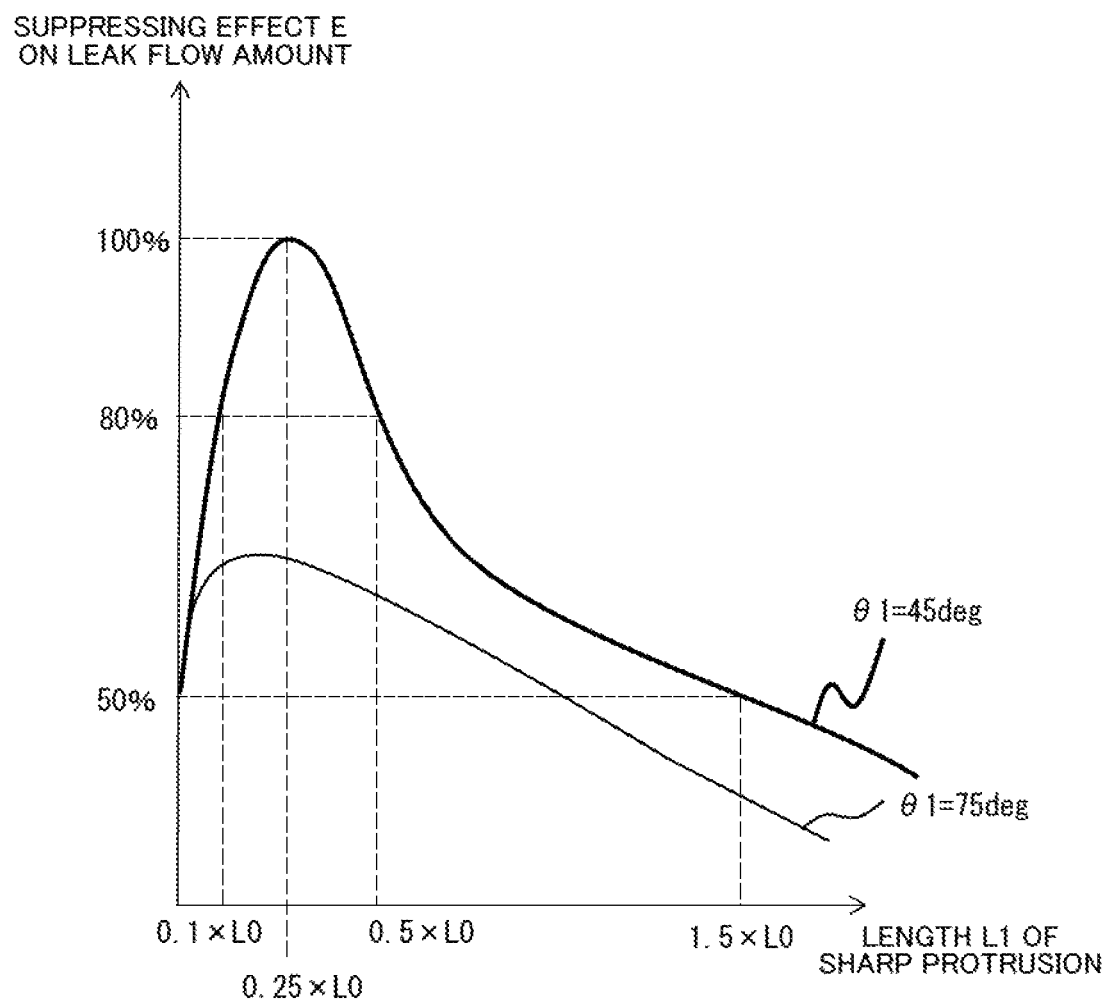
FIG. 5 is a schematic diagram illustrating a setting range of a main dimension of the step seal according to the first embodiment of the present invention, specifically illustrating a result of analyzing the correlation among the suppressing effect E on leak flow amount, the length L1 of a sharp protrusion along the axis direction A, and the angle θ1 of the sharp protrusion.

FIG. 5 is a diagram illustrating a result of analyzing the correlation among the suppressing effect E on the leak flow amount, the length L1 of the sharp protrusion 62 along the axis direction A, and the angle (the angle defined by the inner circumference edge face 62a and the back face 62b) θ1 of the sharp protrusion 62. The suppressing effect E represents a reducing amount of leak, assuming that 100% corresponds to the maximum reducing amount of leak obtained when the angle θ1 is 45 degrees, the length L1 is 0.25 times the length L0 of the fin main body 61 along the axis direction A.

If the length L1 of the sharp protrusion 62 is excessively short, the sharp protrusion 62 loses its original function as a protrusion and degrades the suppressing effect E, and if the length L1 of the sharp protrusion 62 is excessively long, the leak steam SL contracted by the action of the sharp protrusion 62 diffuses on the downstream side while passing through the minute clearance m (i.e., the substantial clearance widens, so that the leak steam SL adheres to the base face of the seal face 6 again and degrades the suppressing effect E. Accordingly, the length L1 and the suppressing effect E on the leak amount establish the relationship depicted in FIG. 5.

In view of FIG. 5, the length L1 of the sharp protrusion 62 is preferably 1.5 times the length L0 of the fin main body 61 along the axis direction A or less (L1≤1.5×L0) for obtaining the suppressing effect E of 50% or more, and is more preferably at least 0.1 times and at most 0.5 times the above length L0 (0.1×L0≤L1≤0.5×L0) for obtaining the suppressing effect E of 80% or more.

Since a smaller angle θ1 of the sharp protrusion 62 (in other words, a thinner sharp protrusion 62) can direct the flow direction D (see FIG. 4A) of the leak steam SL at the separation point Pe toward the upstream side, the angle θ1 is preferably smaller. Specifically, since the flow direction D can be close to the orthogonal direction (the direction being straight with respect to the shroud 51), the preferable angle θ1 is 75 degrees or less (θ1≤75), and is more preferably 45 degrees or less (θ1≤45) because the flow direction D can be directed to the upstream side.

The angle θ2 of FIG. 3 represents the tilt angle of the sharp protrusion 62 and corresponds to an intersection angle of the bisector B that bisects the angle θ1 of the sharp protrusion 62 and the parallel line P. The parallel line P is a line being parallel with the inner circumference edge face 61c and being positioned on the outer circumference side in the radius direction R with respect to the inner circumference edge face 61c of the fin main body 61.

Here, focusing on the intersection angle on the left side of the intersection point of the bisector B and the parallel line P, the intersection angle where the bisector B comes lower than the parallel line P is referred to as negative (minus) and the intersection angle where the bisector B comes higher than the parallel line P is referred to as positive (plus). Accordingly, in the example of FIG. 3, the tilt angle θ2 of the sharp protrusion 62 is negative.

Since the flow direction D of the leak steam SL at the separation point Pe can be close to the orthogonal direction (the direction being straight with respect to the shroud 51), the tilt angle θ2 is preferably in the range of −60 degrees or more and 60 degrees or less (−60≤θ2≤60). Since an excessively large angle θ2 causes the position of the protrusion tip 62c and in turn the separation point to depart from the shroud 51, and consequently widens the graphical clearance between the protrusion tip 62c and the shroud 51, a more preferable range of the angle θ2 is −60 degrees or more and 0 degree or less (−60≤θ2≤0).

The result of analysis shown in FIG. 5 assumes the tilt angle θ2 of the sharp protrusion 62 is −10 degrees.

3. Method for Manufacturing a Seal Fin

Description will now be made in relation to the method for manufacturing a seal fin according to an embodiment of the present invention with reference to FIGS. 6A, 6B, and 6C. The method carries out, in sequence, a cutting step illustrated in FIG. 6A and a grinding step illustrated in FIG. 6B, to complete the manufacturing of the step seal 6 as shown in FIG. 6C.

In the cutting step illustrated in FIG. 6A, a prospective cut portion 101 (a dotted portion in FIG. 6A) being disposed at the edge portion and being formed of a fin raw material 100 is cut with the cutting knife 200 of a cutting device. The prospective cut portion 101 is set to a predetermined range (a predetermined thickness ΔT from an edge surface 100a) in the thickness direction T (the direction that coincides with the radius direction R when the seal fin is mounted to the casing 10) from the edge surface 100a of the fin war material 100. In other words, the dimension of the fin raw material 100 is set in consideration of the thickness ΔT of the prospective cut portion 101 with respect to the product (i.e., the seal fin 6).

The cutting knife 200 is propelled toward the cutting direction C (the direction that extends along the axis direction A when the seal fin 6 is mounted to the casing 10) that crosses the thickness direction T to cut off the prospective cut portion 101.

When the propelling proceeds to make the residue of the prospective cut portion 101 small, the residue bends toward the cutting direction C, coming not to endure the propelling force of the cutting knife 200, and is consequently formed into the protrusion 101' (i.e., remains in the form of a flush), so that the fin raw material 100 comes to be an intermediate product 100. The cutting process may be substituted with electrical discharge machining.

In the grinding step illustrated in FIG. 6B, the face (hereinafter referred to as unprocessed face) 103 on the opposite side of the cut face 102 is not processed yet and is then ground by the grinder 201. Consequently, as illustrated in FIG. 6C, the protrusion 101' is formed into the sharp protrusion 62 having a sharp tip and the manufacturing of the seal fin 6 is completed.

The angle θ1 (see FIG. 3) of the sharp protrusion 62 can be adjusted according to the amount of grinding and the angle of grinding. The tilt angle θ2 (see FIG. 3) of the sharp protrusion 62 can be adjusted by the thrust force that the grinder 201 applies to the protrusion 101' when the grinder 201 grinds the protrusion 101' to form the sharp protrusion 62. The method may further include a processing step of adjusting the tilt angle θ2 of the sharp protrusion 62 through, for example, a bending process separately from the grinding step.

It is preferable that the portion between the front face 61a of the fin main body 61 and the back face 62b of the sharp protrusion 62 is ground so as to smoothly couple the front face 61a and the back face 62b by, for example, rounding the portion because such a structure can guide the leak steam SL smoothly.

4. Advantages

According to one embodiment of the present invention, the following advantages can be ensured.

As illustrated in FIG. 4A, the leak steam SL flowing toward the minute clearance (clearance) m between the seal fin 6 and the shroud 51 is guided by the protrusion 62 formed at the inner circumference edge portion 61b of the seal fin 6 so as to protrude toward the upstream side. As a consequence, the flow direction D of the leak steam SL comes to direct to the upstream side (the direction opposite to the direction that the flow passes the seal fin 6) at the separation point Pe, so that the contraction flow of the leak steam SL is strengthened and a high leak-suppressing effect can be obtained.

Since the protrusion 62 is formed into a sharp protrusion having a sharp tip, the separation point where the leak steak SL separates from the seal fin 6 is formed at the protrusion tip 62c. Accordingly, it is possible to avoid the circumference where "the leak-suppressing effect is degraded by a rounded tip of the protrusion 62". In other words, it is possible to prevent the separation point Pe from moving to the root side (to the casing 10, upward in FIG. 4) with respect to the protrusion tip 62c, suppressing the minute clearance m between the seal fin 6 and the shroud 51 from being substantially widened.

Further, setting the length L1, the angle θ1, and the tilt angle θ2, which are the principal dimensions of the sharp protrusion 62 to respective appropriate ranges ensures higher leak-suppressing effect.

Using such a seal fin 6 having a high leak-suppressing effect can suppress the leak loss of the steam turbine 1 and can ensure high turbine efficiency.

Since the protrusion 62 is provided by using the flush generated in the course of the cutting process, the protrusion 62 can be provided at a low cost, eliminating the requirement for removing the flush.

Figure 7:
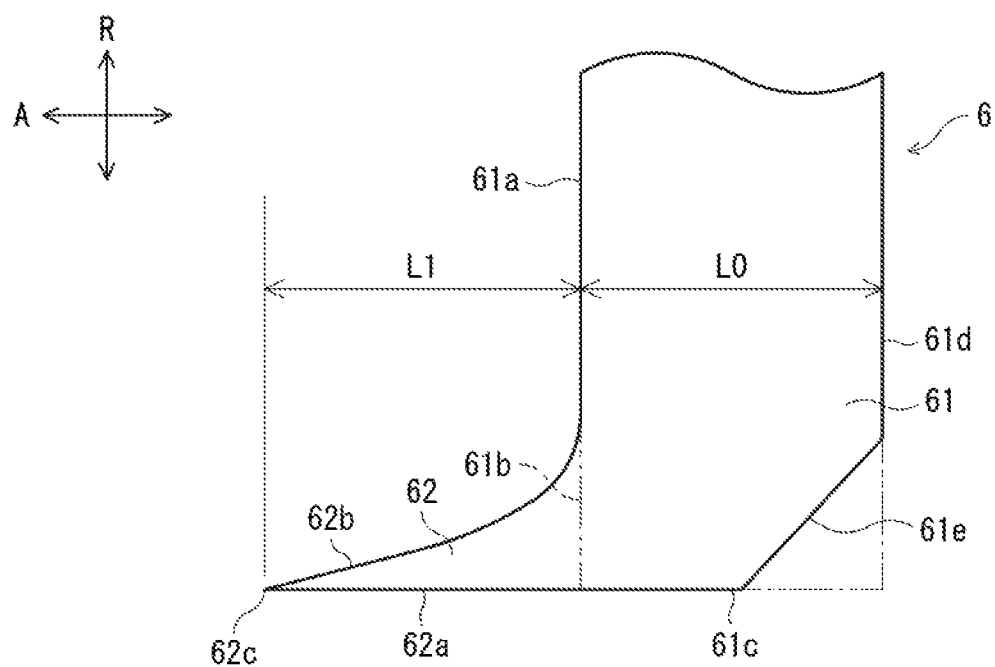
FIG. 7 is a schematic sectional view illustrating the configuration a modification of a tip of a seal fin according to an embodiment of the present invention (omitting slant lines representing the section of the seal fin).

5. Miscellaneous (1) The shape of the tip of the seal fin 6 is not limited to that of the foregoing embodiment. Alternatively, the structure of FIG. 7 may be applied to the configuration of the above embodiment illustrated in FIG. 3. As illustrated in FIG. 7, an inclined face 61e is formed by obliquely cutting off the portion between the back face (i.e., the face facing the downstream side) 61d and the inner circumference edge face 61c of the fin main body 61 and leans to the upstream side as approaching the inner circumference edge face 61c (i.e., faces the inner circumference side (the side of the axis line CL)). If the entire length (=L1+L0) of the seal fin 6 along the axis direction A is long, the leak steam SL contracted by the action of the sharp protrusion 62 diffuses on the downstream side, so that the leak steam SL adheres to the base face of the seal face 6 again. Considering the above, a shorter length of the seal fin 6 along the axis direction A enhances the leak-suppressing effect of the seal fin 6. The structure of FIG. 7 can shorten the length of the seal fin 6 along the axis direction A and thereby can enhance the leak-suppressing effect.

(2) In the above embodiment, the casing 10 and the shroud 51 are regarded as the first structure and the second structure of the present invention, respectively, the seal fin 6 is formed on the casing 10. In an opposite manner, the shroud 51 and the casing 10 may be regarded as the first structure and the second structure of the present invention, respectively, and the seal fins 6 may be formed on the shroud 51.

(3) In the above embodiment, the seal structure of the present invention is applied to the seal structure between the casing 10 and the rotating vanes 50, but may alternatively be applied to the seal structure between the rotating shaft main body 31 and the stationary vanes 40.

(4) The above embodiment uses a step-type shroud 51, but alternatively may use a straight-through-type shroud.

(5) In the above embodiment, the sharp protrusion 62 is provided to each of the seal fins 6A, 6B, and 6C. Alternatively, it is satisfactory that the sharp protrusion 62 is provided at least one of the seal fins 6A, 6B, and 6C.

(6) In the above embodiment, the protrusion 62 is ground into a sharp protrusion having a sharp tip by being ground through the grinding step, but the grinding step can be omitted. In other words, the intermediate product 100' before being ground shown in FIG. 6B may be used as the product seal fin having protrusions 101' in the seal structure and the turbo machine of the present invention. Even not being formed to be sharp, the protrusions 101' can guide the leak steam SL upstream, so that the leak-suppressing effect can be enhanced by canceling the effects caused by the rounded tip.

(7) The above embodiment describes an example that the present invention is applied to a steam turbine. Alternatively, the present invention can be applied to the seal of a turbo machine, i.e., a gas turbine or a turbo compressor, except for a steam turbine. Furthermore, the present invention can be applied to a seal between two structures that relatively rotate in a machine (such as a rotary joint) except for the turbo machine.

EXPLANATION OF REFERENCE SIGNS

1: steam turbine (turbo machine)
2: seal structure
3: step portion
4: base face
5: step face
6,6A,6B,6C: seal fin
10: casing (first structure or second structure)
25,26: cavity
30: rotating shaft
31: rotating shaft main body
40: stationary vane
50: rotating vane
51: shroud (first structure or second structure)
61: fin main body
61a: front face of fin main body 61
61b: inner circumference edge portion (tip portion) of front face 61a
61c: inner circumference edge face (tip face) of fin main body
61d: back face of fin main body 61
61e: inclined face of fin main body 61
62: sharp protrusion
62a: inner circumference edge face (tip face) of sharp protrusion 62
62b: back face of sharp protrusion 62
62c: protrusion tip
100: fin raw material
100': intermediate product
100a: tip face of fin raw material 100
101: prospective cut portion
101': protrusion (flush)
102: cut face of protrusion 101'
103: unprocessed face of protrusion 101'
200: cutting knife
201: grinder
A: axis direction B: bisector of angle θ1
C: cutting direction
CL: axis line
D,D',D*: flow direction of leak steam SL
Gd: gap
h: clearance dimension between seal fin 6 and shroud 51, graphical clearance
h1,h1',h1*: substantial clearance of leak steam SL
L0: length dimension of fin main body 61 along axis direction A
L1: length direction of sharp protrusion 62 along axis direction A
m: minute clearance (clearance)
R: radius direction
S: steam (fluid)
SL: leak steam
T: thickness direction
ΔT: thickness of prospective cut portion 101
Δh: move amount of substantial clearance
θ1: angle of sharp protrusion 62
θ2: tilt angle of sharp protrusion 62

What is claimed is:

1. A seal fin that suppresses leak of a fluid from a gap between a first structure and a second structure facing each other in a radius direction with the gap inbetween and rotating around an axis line relative to each other and that extends from the first structure toward the second structure while keeping a clearance between a tip face thereof on an extending direction and the second structure, the seal fin comprising:
 a fin main body extending in the radius direction; and
 a protrusion formed between a front face of the fin main body, the front face being a flat face and facing an upstream side in a flow direction of the fluid, and a tip face of the fin main body, which tip face faces the second structure and is parallel with the axis line,
 the fin main body comprising an inclined face formed between the tip face and a back face facing a downstream side in the flow direction of the fluid, the inclined face facing toward an inner circumference side, the protrusion protruding toward the upstream side, wherein
 a length of the protrusion along the axis line is 1.5 times a length of the fin main body along the axis line or less;
 an angle of the protrusion is 75 degrees or less; and
 a tilt angle of the protrusion with respect to the tip face of the fin main body is set in a range of −60 degrees or more and 60 degrees or less.

2. The seal fin according to claim 1, wherein the protrusion is a sharp protrusion having a sharp tip.

3. The seal fin according to claim 1, wherein
 a length of the protrusion along the axis line is at least 0.1 times and at most 0.5 times a length of the fin main body along the axis line.

4. The seal fin according to claim 2, wherein
 a length of the protrusion along the axis line is at least 0.1 times and at most 0.5 times a length of the fin main body along the axis line.

5. The seal fin according to claim 1, wherein
 the protrusion has an edge face facing the second structure and being flush with the tip face of the fin main body.

6. The seal fin according to claim 2, wherein
 the protrusion has an edge face facing the second structure and being flush with the tip face of the fin main body.

7. The seal fin according to claim 3, wherein
 the protrusion has an edge face facing the second structure and being flush with the tip face of the fin main body.

8. The seal fin according to claim 4, wherein
 the protrusion has an edge face facing the second structure and being flush with the tip face of the fin main body.

9. A seal structure that suppresses leak of a fluid from a gap between a first structure and a second structure facing each other in a radius direction with the gap inbetween and rotating around an axis line relative to each other, the seal structure comprising:
 a seal fin being defined in claim 1 and being formed on the first structure so as to extend toward the second structure while keeping a clearance between a tip face thereof on an extending direction and the second structure.

10. A turbo machine comprising the seal structure defined in claim 9.

11. A method for manufacturing a seal fin in a seal structure that suppresses leak of a fluid from a gap between a first structure and a second structure facing each other in a radius direction with the gap inbetween and rotating around an axis line relative to each other, the seal fin extending from the first structure toward the second structure while keeping a clearance between a tip face thereof on an extending direction and the second structure, the method comprising:
 a cutting step of setting, in a fin raw material, a predetermined range from a surface of a tip face in a thickness direction to be a prospective cut portion and forming a protrusion protruding toward a cutting direction that crosses the thickness direction by cutting the prospective cut portion in the cutting direction, the protrusion being formed on a face crossing the cutting direction.

12. The method according to claim 11, further comprising:
 a grinding step of grinding the protrusion into a sharp protrusion having a sharp tip.

* * * * *